United States Patent [19]

David

[11] Patent Number: 4,809,549

[45] Date of Patent: Mar. 7, 1989

[54] APPARATUS FOR METERING, MEASURING, OR DOSING FLOWING MEDIA

[76] Inventor: Heinrich David, Sandgasse 28, 6366 Wölfersheim 1, Fed. Rep. of Germany

[21] Appl. No.: 163,990

[22] Filed: Mar. 4, 1988

[30] Foreign Application Priority Data

Mar. 6, 1987 [DE] Fed. Rep. of Germany ....... 3707186

[51] Int. Cl.$^4$ .............................................. G01F 3/20
[52] U.S. Cl. ....................................... 73/271; 137/106
[58] Field of Search ................. 73/239, 249, 262, 269, 73/271; 137/103, 106

[56] References Cited

U.S. PATENT DOCUMENTS 3,440,878 4/1969 Sargent ................................. 73/239
4,055,084 10/1977 Wilde ..................................... 73/249

Primary Examiner—Herbert Goldstein
Attorney, Agent, or Firm—Becker & Becker, Inc.

[57] ABSTRACT

An apparatus for metering, measuring, or dosing flowing media. A distribution slide valve is disposed in a housing between an inlet and an outlet. A metering piston is disposed in a chamber of the housing and divides the chamber into a first and a second metering chamber. The two end positions of the slide valve alternately connect the metering chambers to the inlet or outlet. Transfer passages are disposed on the periphery of the slide valve for selective connection of connecting passages to the inlet, the outlet, and the metering chambers. A transverse connection of the slide valve connects a central control channel thereof to the inlet via a first one of the transfer passages in either of the end positions of the slide valve. Each end of the latter is associated with a hydraulic control chamber into which the control channel opens. Relief passages connect the control chambers to the outlet. A piston rod connected to the metering piston extends axially displaceably through the larger diameter control channel, with the slide valve being axially movable relative to the piston rod. Sealing elements are disposed on the piston rod, with the control channel being adapted to be alternately sealed off relative to one or the other of the control chambers via these sealing elements.

13 Claims, 2 Drawing Sheets

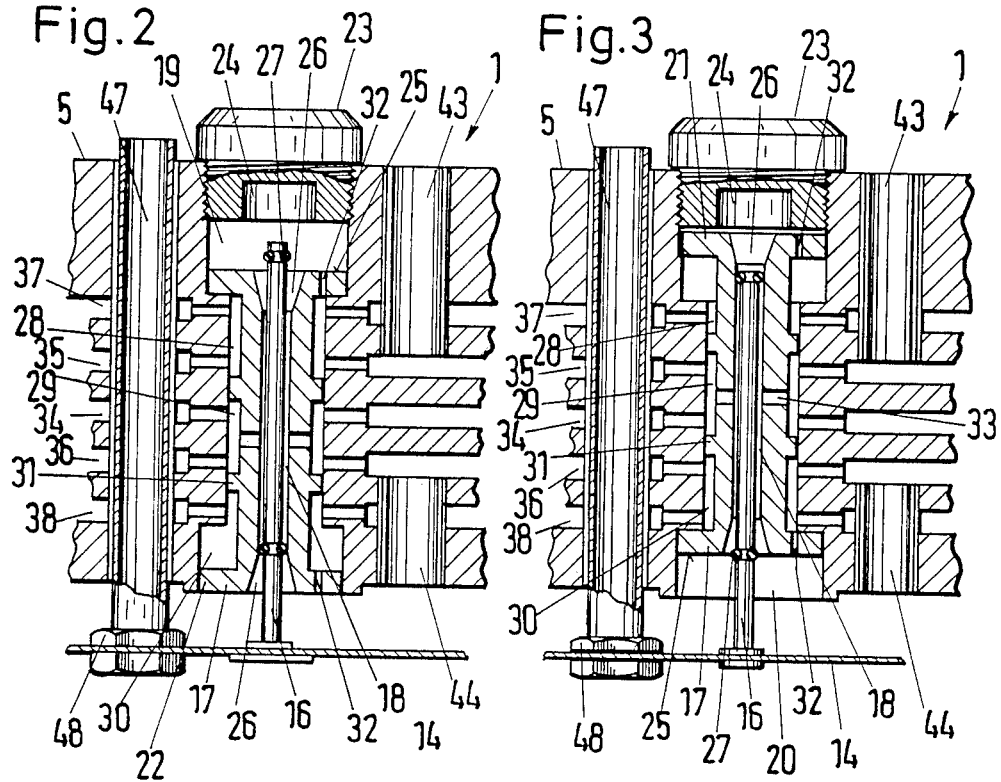

APPARATUS FOR METERING, MEASURING, OR DOSING FLOWING MEDIA

BACKGROUND OF THE INVENTION

The present invention relates to an apparatus for metering, measuring, or dosing flowing media, such as liquids or gases, with said apparatus including: a housing having an inlet and outlet; a chamber that is divided by a metering piston into a first and a second metering chamber; a distributing slide valve that is disposed between the inlet and the outlet in the housing, and that in its two end positions alternately connects the metering chambers with the inlet or with the outlet; a piston rod that is connected to the metering piston and extends in an axially displaceable manner through a larger diameter axial control channel of the slide valve, with the latter being axially movable relative to the piston rod; transfer passages that are disposed in the periphery of the slide valve for controlling the connection of connecting means disposed in the housing to the inlet, the outlet, and the metering chambers; and a transverse connection that is provided in the slide valve to connect the central control channel to the inlet.

DE-A No. 25 49 576 discloses an apparatus of this type where the piston rod is embodied for mechanical operation of the slide valve. For this purpose, in each of the directions of movement, the piston valve acts via a spring-loaded mechanism upon the slide valve, which is arrested in its first end position, and pushes the latter out of this arrested position after the spring-loaded mechanism is tensioned. The spring-loaded mechanism can then relax and effect an accelerated shifting of the slide valve into its second end position, in which the arresting mechanism again engages.

In one end position of the slide valve, the first metering chamber is connected to the inlet via the central control channel and a transverse connection in the slide valve, and the second metering chamber is connected to the outlet via connecting means in the housing and transfer passages in the slide valve. In the other end position, the slide valve connects the first metering chamber with the outlet via the central control channel, and the inlet with the second metering chamber via the connecting means.

Due to the large number of structural elements, the manufacturing costs as well as maintenance costs for the apparatus are very high. Due to the springs that are provided, a specific transfer pressure of the medium is required in order to be able to operate the apparatus. The large number of individual parts lead to a relatively high operating noise, and also result in a high susceptibility to problems and even breakdown, thus practically precluding use of the apparatus, especially with corrosive media.

Pursuant to another known apparatus (DE-B No. 24 02 828), the operation is effected via only a portion of the flowing medium, since the greatest part flows around the control mechanism provided in the housing and is conveyed directly to the outlet, while only a small quantity of the medium that flows in is used to drive the metering piston. The partial quantity is conveyed through a restrictor, resulting in a pressure loss. A further pressure loss occurs in the region of the outlet due to the spring-loaded control valves that are located there and that additionally cause certain striking or chattering noises and are mechanically susceptible. Consequently, this known dosing pump also responds at only high throughput quantities, and also requires a relatively high operating pressure due to the not inconsiderable pressure losses caused by the spring-loaded control valves, so that it is not possible to use this apparatus when the flow through quantities and/or the medium pressure is low.

It is an object of the present invention to improve the known apparatus for metering, measuring, or dosing flowing media in such a way that with a small number of components, a low-noise and low-wear, disturbance-free operation can be assured at a low operating pressure.

BRIEF DESCRIPTION OF THE DRAWINGS

This object, and other objects and advantages of the present invention, will appear more clearly from the following specification in conjunction with the accompanying schematic drawings, in which:

FIG. 2 is a cross-sectional view of the inner portion of the apparatus of FIG. 1 turned by 90°, FIG. 3 shows the inner portion of the apparatus of FIG. 2, but with the slide valve shown in a different position, and FIG. 4 shows the inner portion of the apparatus of FIG. 3, but with a modified embodiment of the slide valve.

SUMMARY OF THE INVENTION

Figure 1:
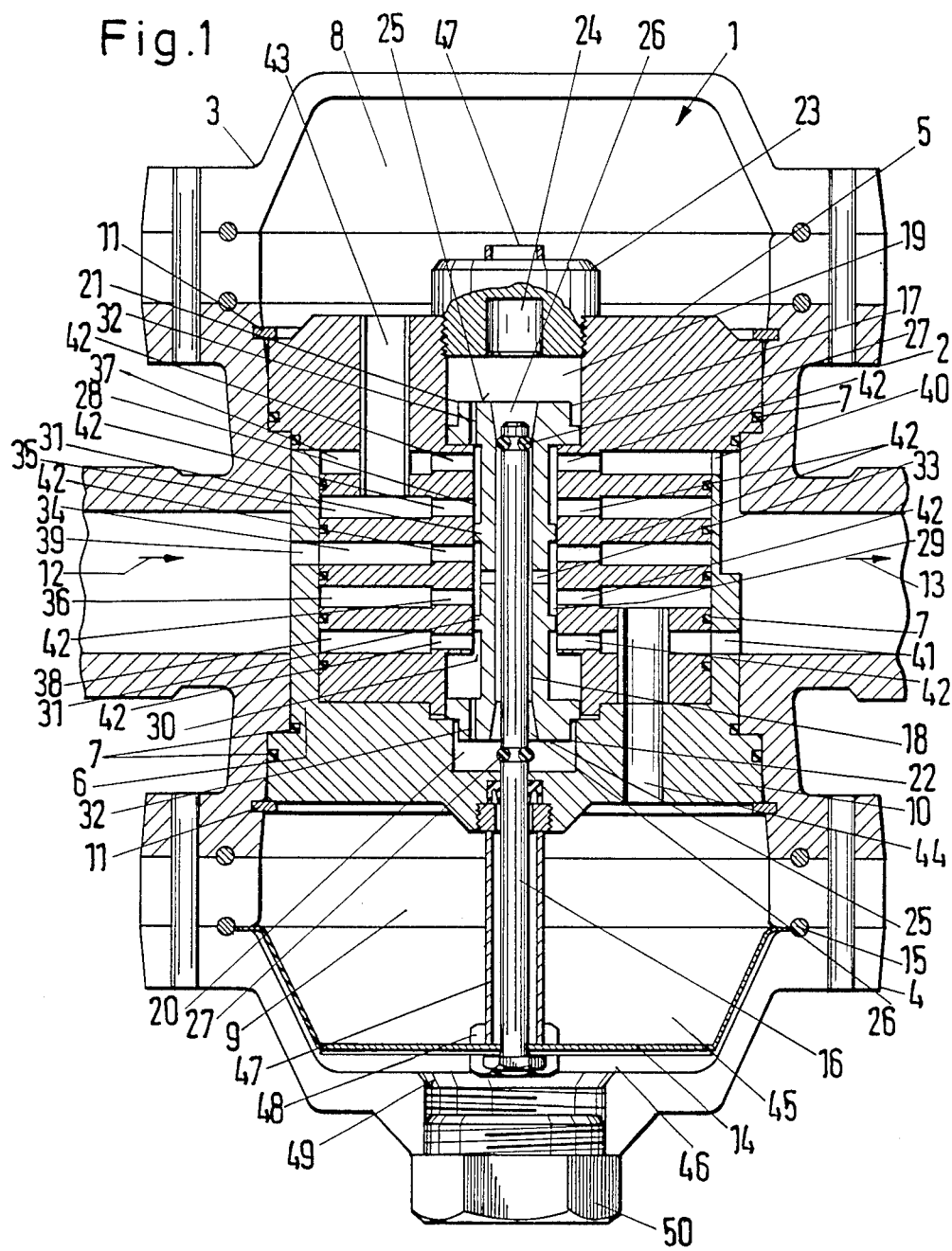
FIG. 1 is a cross-sectioned side view of the inventive apparatus.

The apparatus of the present invention is characterized primarily in that: the control channel is connected to the inlet via one transfer passage and the transverse connection in every end position of the slide valve; for exclusively hydraulic operation, in both axial directions, i.e. at each end, the slide valve is associated with a respective hydraulic control chamber into which the control channel opens, with respective relief passage means being provided for connecting the control chambers to the outlet; and the control channel is adapted to be alternately sealed off relative to one or the other of the control chambers via sealing elements that are disposed on the piston rod.

The control channel, which can be sealed off by the sealing elements on the piston rod relative to one or the other of the control chambers, serves exclusively for transferring or conveying pressure, while the main stream, as a measured or metered volumetric quantity, is conveyed via the respective metering chamber to the outlet. The exclusively hydraulically effected reversal takes place with only two movable parts, namely the slide valve and the piston rod that is connected to the metering piston; for this reason, the inventive apparatus operates with little noise and without problems. Since no spring forces have to be overcome for reversal, and since the entire volume of the stream is utilized to displace the metering piston, the apparatus has a low operating or transfer pressure, so that it can also be used for flowing media of low pressure, and operates free of problems. Due to the exclusively hydraulic activation of the slide valve, no noticeable mechanical wear occurs. The apparatus can thus be operated over longer operating periods without maintenance without thereby having to worry about inaccuracies in the metering or problems with the device.

Further specific features of the present invention will be described in detail subsequently.

DESCRIPTION OF THE PREFERRED EMBODIMENTS

Referring now to the drawings in detail, the inventive apparatus 1 is embodied as a complete volume control pump unit, and can preferably be used for metering or dosing flowing media, such as liquids or gases. The apparatus 1 includes a housing 2 that is closed off in the axial direction on opposite sides (top and bottom) via a respective hood-like cap or cover 3, 4. Disposed in the central portion of the housing 2 is a housing insert 5 that is placed in a cylinder 6. The housing insert 5 is sealed relative to the wall of the cylinder 6 and relative to the wall of the housing via sealing rings 7. Similarly, the cylinder 6 is sealed relative to the wall of the housing 2 via sealing rings 7. In addition, the housing 2 is provided with an upper chamber 8 and a lower chamber 9. The chamber 8 is essentially delimited by the cover 3 and the housing insert 5, while the chamber 9 is delimited by the bottom 10 of the inserted cylinder 6 and by the lower cover 4. The housing insert 5 and the cylinder 6 can be removably held in place in the housing 2, for example via snap-ring-like securing elements 11. Provided in the lower cover 4 is a central opening 49 that is tightly closed off by a threaded plug 50.

To allow the medium to flow in transverse to the longitudinal axis of the housing 2, an inlet 12, preferably embodied as a connector, can be provided on one (the left) side of the housing 2. The outlet 13, preferably also embodied as a connector, can be disposed on the opposite (the right) side of the housing 2 for the withdrawal of the medium. The housing 2, the cylinder 6, and the housing insert 5 can be made of plastic or metal.

Disposed in the lower chamber 9 of the housing, as a metering piston, is a diaphragm piston 14, the peripheral edge 15 of which can be sealingly secured between flanges of the housing 2 and the cover 4. The metering piston divides the lower chamber 9 into a first metering chamber 45 and a second metering chamber 46. The piston 14, which in the illustrated embodiment is preferably embodied as a diaphragm, could also be embodied in a different, not illustrated embodiment as a non-resilient disk or cylinder piston that is sealingly glidingly guided in the chamber 9 along a cylindrical inner surface. The center of the diaphragm piston 14 is secured to a piston rod 16 that is disposed coaxially relative to the vertical central axis of the apparatus 1, and is sealingly guided in the bottom 10 of the cylinder 6. The piston rod 16 extends through a distributing slide valve 17 that is axially displaceably mounted in the housing insert 5. The diameter of the bore that extends axially through the slide valve 17 is greater than the piston rod 16, so that a control channel 18 in the form of an annular gap is provided for the medium. The control channel 18 establishes a connection between an upper control chamber 19 in the housing insert 5 and a lower control chamber 20 formed in the bottom 10 of the cylinder 6.

The control chambers 19, 20 are partially delimited by the piston elements 21, 22 that are formed on opposite ends of the slide valve 17. The control chamber 19 in the housing insert 5 can be tightly closed off at the top via a threaded plug 23 that can be provided on the inside with a blind hole 24 into which the free end of the piston rod 16 can enter during an upward axial displacement thereof. Each of the opposite ends of the slide valve 17, in the region of the piston elements 21, 22, has a conically widened portion 26 that opens in the direction toward the end face 25 of the pertaining piston, i.e. toward the control chamber 19 or 20. In addition, as can be seen from the drawings, two spaced-apart sealing elements (O-rings) 27 are disposed on the piston rod 16; these sealing elements alternately seal and release the annular-gap-like control channel 18 by being pushed into or out of the conically widened portions 26 of the slide valve 17 when the piston rod 16 is shifted.

In the region between the two piston elements 21 and 22, the slide valve 17 is provided with three transfer passages 28, 29, and 30 that are delimited by circumferential collars 31 and, at the ends, by the piston elements 21, 22. The transfer passages 28, 29, 30 are therefore embodied as circumferential grooves on the slide valve 17; in the embodiment illustrated in FIGS. 1 to 3, these transfer passages are relatively narrow since the diameter of the circumferential collars 31 is less than the diameter of the piston elements 21, 22. As a result, the transfer passages 28, 29, 30 of this embodiment are relatively narrow annular gaps, the axially length of which is several times greater than their radial depth. Each piston element 21, 22 has embodied therein a passage 32 as a relief opening for the control chamber. The passage 32 in the piston element 21 establishes a connection between the upper control chamber 19 and the upper transfer passage 28, while the passage 32 in the piston element 22 connects the lower control chamber 20 to the lower transfer passage 30. The passage 32 has a cross-sectional passage are that is considerably less than that of the control channel 18 that supplies the medium. Furthermore the slide valve 17 has a transverse connection 33 between the central transfer passage 29 and the control channel 18.

The housing insert 5 is provided with an entry chamber 34, two guide chambers 35, 36, and two discharge chambers 37, 38. These entry, guide, and discharge chambers 34 to 38 can preferably be embodied as annular chambers that surround the slide valve 17, and are disposed in the housing insert 5 in various planes at a distance from one another, i.e. one above the other. The entry chamber 34 is disposed approximately in the middle of the housing insert 5 between the guide chamber 35 that is disposed above it and the guide chamber 36 that is disposed below it. Formed in the wall of the cylinder 6 between the inlet 12 and the entry chamber 34 is an opening 39. In addition, the opposite side of the wall of the cylinder 6 is provided with an opening 40 to connect the outlet 13 to the upper discharge chamber 37, and a further opening 41 to connect the outlet to the lower discharge chamber 38.

The connection between the chambers 34 to 38 and the transfer passages 28, 29, 30 is effected by bores 42 that are preferably disposed in the planes of the chambers 34 to 38. The distance between the chambers 34 to 38, and the length of the transfer passages 28 to 30, is such that the length of each of the transfer passages 28, 29, 30 in the axial direction is somewhat greater than the distance between two of the chambers 34 to 38. The transfer passages 28 to 30 and the chambers 34 to 38 are coordinated with one another in such a way that in the lower position (first end position) of the slide valve 17 (FIGS. 1 and 2), the transfer passage 29 connects the inlet chamber 34 with the guide chamber 36, and the transfer passage 28 connects the guide chamber 35 with the upper discharge chamber 37. In the other, upper position (second end position) of the slide valve 17 (FIGS. 3 and 4), the entry chamber 34 and the guide chamber 35 are connected via the central transfer passage 29, while the guide chamber 36 and the discharge chamber 38 are connected by the transfer passage 30.

In the embodiment illustrated in FIG. 4 it should also be noted that with this slide valve 17', the transfer passages 28, 29, 30, which are embodied as circumferential grooves, are considerably deeper, so that a greater cross-sectional area, and hence a greater annular volume, is provided for the flow-through of the medium. In this connection, the slide valve 17 has an essentially cylindrically uniform outer diameter. In other words, the diameter of the piston elements 21, 22 and the diameter of the circumferential collars 31 is essentially the same. The diameter of the collars 31 could even be greater than the diameters of the piston elements 21, 22. Due to the larger cross-sectional area of the transfer passages 28, 29, 30, the advantage of an extremely low pressure loss is achieved, so that the inventive apparatus can be utilized in a particularly advantageous manner for flowing media that has a very low pressure. The inventive apparatus with the other slide valve 17 (FIGS. 1 to 3), where the transfer passages 28, 29, 30 are narrower, can be utilized in a particularly advantageous manner where the minimum transfer limits of the device are to be extremely low.

As can be further seen in FIGS. 1 to 3, the upper guide chamber 35 is connected to the upper chamber 8 of the housing via a channel 43. The lower guide chamber 36 is connected to the lower chamber 9 of the housing via a channel 44. FIGS. 1 to 3 also show that a connecting channel 47 is provided between the upper chamber 8 and the second, closed-off metering chamber 46. The connecting channel 47 passes through the housing insert 5 and the bottom 10 of the cylinder 6, and in so doing can be expediently axially shiftably guided with minimum friction in a slide sleeve, which is made, for example, of plastic. The connecting channel 47 passes through the diaphragm piston 14, and can be detachably secured to the latter via a threaded nut 48. It is also within the scope of the present invention to embody the connecting channel 47 between the upper chamber 8 of the housing and the lower metering chamber 46 in a different manner, for example by guiding the connecting channel along the outside of the housing in the form of a hose or the like.

During operation of the apparatus 1, the medium flows from the inlet 12, through the opening 39, into the entry chamber 34, and from there through one of the bores 42 into the central transfer pass age 29 of the exclusively hydraulically activated slide valve 17; the medium then passes into the guide chamber 36 and through the channel 44 into the first, upper metering chamber 45 that is disposed above the diaphragm piston 14, whereupon the medium presses the piston 14 downwardly. The medium located in the lower metering chamber 46 is conveyed via the connecting channel 47 into the upper chamber 8 of the housing and flows from there through the channel 43 into the guide chamber 35 and through the bore 42 into the upper transfer passage 28 of the slide valve 17. From there, the medium flows into the upper discharge chamber 37 and through the opening 40 to the outlet 13.

If as illustrated in FIGS. 1 and 2 the diaphragm piston 14 is in its lower reversing location, a portion of the incoming medium flows, via the transverse connection 33 in the slide valve 17, through the control channel 18 into the control chamber 20 below the slide valve 17 and pushes the latter upwardly in the opposite direction. The medium in the upper control chamber 19 is displaced and flows through the passage 32 in the upper piston element 21 into the transfer passage 28, then into the discharge chamber 37, and from there to the outlet 13.

If the diaphragm piston 14 is disposed in its upper reversing location (FIGS. 3 and 4), the medium flows from the inlet 12, through the entry chamber 34 and the central transfer passage 29, into the guide chamber 35. From there, the medium flows through the channel 43 into the upper chamber 8 of the housing, and from here, via the connecting channel 47, into the lower metering chamber 46, as a result of which the diaphragm piston 14 is pressed upwardly. The medium disposed above the diaphragm piston 14 in the chamber 9 of the housing is conveyed through the channel 44, the guide chamber 36, the lower transfer passage 30, and the lower discharge chamber 38, to the outlet 13.

As already indicated, it can also be expedient to have an embodiment where the connecting channel 47 does not serve a guide function for the diaphragm 14. For example, it would be conceivable, in place of the illustrated connecting channel 47, to dispose hoses or other connecting lines externally of the housing 2, whereby these connecting lines connect the metering chamber 46 with the chamber 8 of the housing.

The inventive apparatus 1 does not itself serve to meter liquid, but rather is essentially a driving unit that can preferably also be utilized as a quantity metering or measuring unit, since the diaphragm piston 14 is moved in proportion to the quantity of medium that flows in. Accordingly, the number of diaphragm strokes per unit of time is a measure for the quantity of medium that has flowed through the unit, so that this unit can be used as a precisely operating quantity measuring unit.

If the inventive apparatus 1 is associated with a dosing device, the diaphragm piston 14, or its piston rod 16, is then securely connected to the piston or piston rod of the dosing unit; this can be effected via the opening 49. The dosing piston then carries a movement that conforms to the movement of the diaphragm, and similarly conveys the medium that is to be dosed in a quantity-proportional manner.

With the inventive apparatus 1, the entire quantity of the medium that is flowing in is used to control the metering piston via the described chambers, so that the entire volume that is flowing in acts completely upon the diaphragm piston 14, and merely a low quantity of medium and a low medium pressure are necessary to operate the apparatus. Thus, already relatively small quantities can be precisely dosed and measured. Since the medium can flow through the apparatus 1 in a largely unthrottled manner, and no spring-loaded valve controls are present, the pressure loss is very low, so that a high efficiency is assured. Since only few movable parts and no mechanical springs are present, almost no wear occurs, as a result of which a reliable operation is assured over a long period of time. Due to its inventive configuration, the apparatus 1 operates extremely quietly, and causes no striking or other annoying noises.

The present invention is, of course, in no way restricted to the specific disclosure of the specification and drawings, but also encompasses any modifications within the scope of the appended claims.

What I claim is:

1. An apparatus for metering, measuring, or dosing flowing media, said apparatus comprising:
a housing having an inlet, an outlet, a first chamber, and connecting means for medium;

a metering piston that is disposed in said first chamber and divides the latter into a first and a second metering chamber;

a distributing slide valve that has two opposite ends and is disposed in said housing between said inlet and said outlet thereof, said slide valve being axially movable between two end positions that alternately connect said metering chambers to said inlet or to said outlet, with said slide valve further having a central axial control channel that extends therethrough, and also having a periphery in which are disposed transfer passages for selective connection of said connecting means of said housing to said inlet, said outlet, and said metering chambers, with said slide valve additionally being provided with a transverse connection that communicates with said control channel for connecting the latter to said inlet, via said connecting means and a first one of said transfer passages, in either of said end positions of said slide valve; for exclusively hydraulic operation, each of said ends of said slide valve is associated with a respective hydraulic control chamber that is provided in said housing and into which said control channel opens, with respective relief passage means being provided for connecting said control chambers to said outlet;

a piston rod that is connected to said metering piston and extends axially displaceably through said control channel, with the diameter of said piston rod being less than the diameter of said control channel, and with said slide valve being axially movable relative to said piston rod; and sealing elements disposed on said piston rod, with said control channel being adapted to be alternately sealed off relative to one or the other of said control chambers via said sealing elements.

2. An apparatus according to claim 1, in which said housing is provided with a housing insert in which said slide valve is guided; and in which said connecting means includes, in said housing insert: an entry chamber that communicates with said inlet and said first one of said transfer passages; respective channel means that lead to said metering chambers; two guide chambers that are adapted to alternately communicate with said entry chamber via said first one of said transfer passages, with each of said guide chambers communicating with one of said metering chambers via a respective one of said channel means; and two discharge chambers that are adapted to alternately communicate with said guide chambers via a second and a third one of said transfer passages of said slide valve, with said discharge chambers also communicating with said outlet.

3. An apparatus according to claim 2, in which said entry chamber, said guide chambers, and said discharge chambers are disposed next to and at a distance from one another in said housing insert, and are disposed in different planes.

4. An apparatus according to claim 3, in which said entry, guide, and discharge chambers are embodied as annular chambers that extend around said slide valve.

5. An apparatus according to claim 3, in which said transfer passages of said slide valve are in the form of circumferential grooves that are separated from one another by circumferential collars of said slide valve, with the axial length of said circumferential grooves being somewhat greater than the distance between two adjacent ones of said entry, guide, and discharge chambers of said housing insert.

6. An apparatus according to claim 5, in which said slide valve is disposed between said control chambers, with each of said opposite ends of said slide valve being provided with a piston element that has an end face, whereby the end face of one piston element faces away from the end face of the other piston element, and said end faces help to delimit said control chambers; said relief passage means are provided in said piston elements and establish communication between said control chambers and said second and third ones of said transfer passages, and hence between said control chambers and said discharge chambers, which communicate with said outlet 7. An apparatus according to claim 6, in which each of said piston elements of said slide valve is provided with a widened portion that opens toward a given one of said control chambers and serves for the insertion or removal of said sealing elements of said piston rod thereinto or therefrom.

8. An apparatus according to claim 7, in which each of said widened portions has a conical configuration.

9. An apparatus according to claim 6, in which said circumferential collars between said transfer passages of said slide valve have a diameter that is less than the diameters of said piston elements; and in which said transfer passages are narrow, having a radial depth that is several times less than their axial length.

10. An apparatus according to claim 6, in which said circumferential collars between said transfer passages of said slide valve have a diameter that is approximately equal to or greater than the diameters of said piston elements, with the radial depth, and hence the volume, of said transfer passages being relatively large.

11. An apparatus according to claim 2, in which said housing has a second chamber and is further provided with a cylinder in which are disposed said housing insert, said slide valve, and said piston rod, with said cylinder and said housing insert being disposed in said housing between said first and second chambers thereof; and in which said connecting means further includes: a first opening in said cylinder to establish said communication between said inlet and said entry chamber of said housing insert; and respective second and third openings to establish said communication between said discharge chambers and said outlet.

12. An apparatus according to claim 11, in which said cylinder and said housing insert are coaxially disposed in said housing.

13. An apparatus according to claim 11, in which said connecting means further includes a connecting channel that is axially displaceably guided in said housing insert and in said cylinder, that extends through said metering piston, and that establishes communication between said second chamber of said housing and said second metering chamber.

* * * * *